United States Patent
Wiener et al.

(10) Patent No.: US 7,526,377 B2
(45) Date of Patent: Apr. 28, 2009

(54) ROUTE CALCULATION AROUND TRAFFIC OBSTACLES USING MARKED DIVERSIONS

(75) Inventors: Martin Wiener, Reinbek (DE); Frank Tiedtke, Lubeck (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 612 days.

(21) Appl. No.: 10/528,525

(22) PCT Filed: Jul. 17, 2003

(86) PCT No.: PCT/US03/22349

§ 371 (c)(1),
(2), (4) Date: Mar. 18, 2005

(87) PCT Pub. No.: WO2005/017855

PCT Pub. Date: Feb. 24, 2005

(65) Prior Publication Data

US 2005/0251324 A1 Nov. 10, 2005

(51) Int. Cl.
*G01C 21/26* (2006.01)
(52) U.S. Cl. .................. 701/200; 701/209; 701/117
(58) Field of Classification Search ......... 701/200–202, 701/208–209, 23, 25, 117; 340/988
See application file for complete search history.

(56) References Cited

U.S. PATENT DOCUMENTS

| | | | |
|---|---|---|---|
| 6,216,088 B1 | 4/2001 | Schulz et al. | |
| 6,385,539 B1 | 5/2002 | Wilson et al. | |
| 6,601,073 B1 | 7/2003 | Robare | |
| 6,622,087 B2 | 9/2003 | Anderson | |

FOREIGN PATENT DOCUMENTS

| | | |
|---|---|---|
| EP | 1 102 227 A3 | 5/2001 |
| EP | 1 139 066 A2 | 10/2001 |
| JP | 08-083399 | 3/1996 |
| JP | 08-105752 | 4/1996 |
| JP | 08-136277 | 5/1996 |
| JP | 2001-504590 | 4/2001 |
| JP | HEI 13-331493 | 11/2001 |
| JP | 2002-243476 | 8/2002 |
| KR | 2001-0064816 A | 7/2001 |

(Continued)

OTHER PUBLICATIONS

Patent Cooperation Treaty International Search Report, PCT/US03/22349, filed Jul. 17, 2003.

(Continued)

*Primary Examiner*—Yonel Beaulieu
(74) *Attorney, Agent, or Firm*—Brinks Hofer Gilson & Lione

(57) ABSTRACT

A vehicle navigation system (100; FIG. 1) that includes a route calculation module (204; FIG. 2) that is operable to use marked diversions to avoid traffic events. The navigation system includes a simulation module (212) that is used to simulate traffic events that may occur along a route to a trip destination. A diversion module (214) is used to calculate a plurality of marked diversions that avoid the traffic events that may occur along the route. If a traffic event occurs along the route, the route calculation module only searches roads that contain a marked diversion to determine an alternative route around the traffic event.

61 Claims, 5 Drawing Sheets

FOREIGN PATENT DOCUMENTS

| | | |
|---|---|---|
| KR | 2002-0079106 A | 10/2002 |
| WO | WO 98/24080 | 6/1998 |
| WO | WO 99/48073 A1 | 9/1999 |
| WO | WO 02/17268 A1 | 2/2002 |

OTHER PUBLICATIONS

Japanese Office Action w/English translation, dated Jun. 25, 2008, 9 pgs.
Translation of Canadian Office Action dated Feb. 7, 2007, 3 pgs.
Translation of Chinese Office Action dated Mar. 16, 2007, 5 pgs.
Translation of Korean Office Action dated Jan. 5, 2007, 7 pgs.
Translation of Korean Office Action dated Jun. 8, 2007, 4 pgs.
Translation of Korean Office Action dated Jul. 18, 2007, 6 pgs.
Translation of Korean Office Action dated Jul. 25, 2008, 11 pgs.
Translation of Korean Office Action dated Aug. 29, 2008, 8 pgs.
Translation of Japanese Office Action dated May 8, 2007, 3 pgs.

ROUTE CALCULATION AROUND TRAFFIC OBSTACLES USING MARKED DIVERSIONS

BACKGROUND OF THE INVENTION

1. Technical Field

This invention relates generally to vehicle navigation systems and, more particularly, to simplifying route calculation around traffic obstacles by employing a marked diversion.

2. Related Art

Vehicle navigation systems are becoming increasingly popular in the automobile industry. A typical vehicle navigation system may include a global positioning system ("GPS") receiver that is mounted somewhere on the vehicle. The GPS receiver is capable of communicating with a satellite-based global positioning system or other localized positioning systems. The GPS receiver obtains geographic position information that is converted into some form of display for the vehicle operator indicating the position of the vehicle relative to previously determined reference points or other known landmarks on a given map database. Other systems and devices may be used to determine the geographic position of the vehicle as well.

The typical vehicle navigation system may also include a digital map database that includes digitized map information that can be processed by a navigation computer designed to handle map-related functions. A map matching module may be used to match the position or trajectory measured by a positioning module to a position associated with a location or route on a map provided from the digital map database. The positioning module may receive its information from the GPS receiver.

The typical vehicle navigation system may also include a human-machine interface module that provides users with a way to interact with the navigation system. A visual display is typically used to convert signals into a visual image in real time for direct interpretation by the user. As such, displays are used to provide optical driver recommendations, which are usually conveyed by a digital map generated on the display. The display itself is typically an electro-optical device such as a liquid crystal display ("LCD"), a cathode-ray tube ("CRT") display, an electroluminescent display ("ELD"), a heads-up display ("HUD"), a plasma display panel ("PDP"), a vacuum fluorescent display ("VFD"), or a touch-screen display.

A route planning module may also be included that is used to plan a route prior to or during a trip. One commonly used technique is to find a minimum-travel-cost route, which is designed to minimize the amount of distance traveled and the costs associated with reaching a predetermined destination. Other techniques exist that integrate the time one needs if using dedicated roads or may use information about traffic congestion on the route to calculate a route that avoids the traffic congestion. A route guidance module is also included that is used to guide the driver along the route generated by the route planning module. The real time or en-route guidance is typically generated using optical driver recommendations on the display and may also include acoustic driver recommendations.

If traffic congestions or other obstacles are reported along a planned route, the vehicle navigation system will have to find a deviation to the planned route that might require the use of roads of minor importance. For the reason of limited time and memory, it is not possible for a current routing algorithm to check every road to see if it is useful for the best alternative route. The standard search only considers major roads at greater distances from the trip origin and destination and typically only considers smaller roads near the trip origin and destination. As such, if the best alternative route requires a local deviation around an obstacle on smaller roads, the vehicle navigation system should be capable of locating these smaller roads.

Calculation of long trips may be performed by a subdivision of the road network into functional road classes. In the middle of the journey routing techniques as presently implemented on navigation devices only search the most important road connections. These techniques fail to find a recommendable alternative route. Thus, the navigation device may stick to the route as originally calculated deteriorated by one or more traffic obstacles or events.

SUMMARY

This invention provides a vehicle navigation system that includes a route calculation module that is capable of using marked diversions to avoid traffic events or obstacles. The vehicle navigation system may include a navigation control unit that may be connected with a display, a user input device, a digital map database, a positioning system, a storage device and a traffic event notification device. The display may be used to generate a graphical representation of a road network map included in the digital map database that may be used to guide the driver along a route to a predetermined destination. In addition, the display may be used as an input device if the display comprises a touch-screen display. The user input device may be used by the driver to enter information about the trip destination as well as other travel options or restrictions as desired by the driver of the vehicle.

The digital map database may be located on a CD-Rom, a hard disc storage device or any other suitable storage medium. The digital map database may contain a digital map of a road network for various geographic locations as well as other types of data. In particular, the digital map database may contain information about the functional road classes of various roadways or roads that are contained within the road network map. The functional road classes may designate roads in many different categories such as, for example, interstates, motorways, toll-ways, city streets, urban arteries, rural streets, neighborhood streets and so forth. Other road data may also be contained in the digital map database such as a lane number indication and a speed limit indication associated with respective roads.

The digital map database may be generated based on geographic coordinates and a plurality of roadways that are positioned with respect to the geographic coordinates. The process of converting a map into a digital map database may be referred to as a map conversion. A map of any given area will contain a plurality of roadways that may be used by a driver to travel to a destination. The roadways may be classified in one of the functional road classes set forth above or any other type of functional road class.

During map conversion a plurality of obstacles or traffic events are simulated between respective nodes or on segments of the roadways that are included in the digital map database. For the purpose of this invention, nodes or segments may be considered as map elements. A traffic event simulation module may be used to simulate the traffic events that may occur between respective nodes or on segments of the roadways. In addition, the traffic event simulation module may be used to simulate traffic events along multiple segments of the roadways. Once the traffic events are simulated, at least one marked diversion may be calculated for each segment of roadway that is contained in the road network map. As such, a plurality of marked diversions may be generated that are associated with a respective segment of the roadway or multiple segments of the roadway. The marked diversions may be stored in the digital map database in addition with the other data that is stored in the digital map database.

A route guidance module located on the vehicle navigation system may be used to guide the driver of the vehicle along the route that has been calculated by the route calculation module. If the vehicle navigation system receives information indicating that a traffic event has occurred along one or more of the road segments of the route, the route calculation module may lookup the marked diversion that is associated with that particular road segment and guide the driver along an alternative route that avoids the traffic event. As set forth above, at least one marked diversion that is associated with that particular road segment or section will have already been calculated by the traffic event simulation module and stored in the digital map database when the digital map database is created during the map conversion process.

The memory storage device is used to store various types of data that is used by the vehicle navigation system. Trip origins and trip destinations may be stored in the memory storage device as well as calculated routes to trip destinations. In addition, the marked diversions that are calculated during the map conversion process may also be stored in the memory storage device. In other words, the marked diversions may be stored together with (as part of) the digital map. Various other types of data and information may be stored in the memory storage device that may be used by the vehicle navigation system.

During map conversion a plurality of marked diversions are generated for each road segment that is contained in the digital map database. Once the route has been calculated, the vehicle navigation system will be capable of identifying each road segment that will be included in the route. The route calculation module may also be operable to determine the marked diversions that are associated with the road segments that are included in the route.

In another example of the invention, the vehicle navigation system may also include a traffic event simulation module that is used to simulate any kind of traffic event that may occur along the route that has been calculated by the route calculation module. The traffic event simulation module may divide the route into a plurality of road segments and create simulated traffic events along each of these road segments. The road segments may consist of portions or roadways that lie between two road intersections or any other designated distance.

A diversion module may also be included for calculating the marked diversions as a function of the traffic events that are created by the traffic event simulation module. The marked diversions consist of roads that will help the driver of the vehicle avoid the traffic event or obstacle while traveling to the trip destination. The marked diversions may consist of any road that is connected to the road segment that is being traveled on during the trip to the destination.

The diversion module may use any functional road class to avoid the traffic event, while the route calculation module will only use major roads for calculating routes for long trips. As such, the diversion module may create marked diversions for local deviations around traffic events or obstacles that use smaller or local roads to avoid the traffic event. After the diversion module has determined the marked diversions, they may be stored in the memory storage device for later use by the vehicle navigation system.

If the navigation control unit receives a notification from a traffic event notification device while traveling to the destination that designates a traffic event ahead at a road segment, the route calculation module will preferably search the marked diversions that are stored in memory for that particular road segment for a route to avoid the traffic event. As such, all other roads that may be contained in the road network map of that particular geographic area will be neglected by the route calculation module. This saves time and processing power by allowing the navigation control unit to concentrate on marked roads while ignoring roads that have not been marked.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
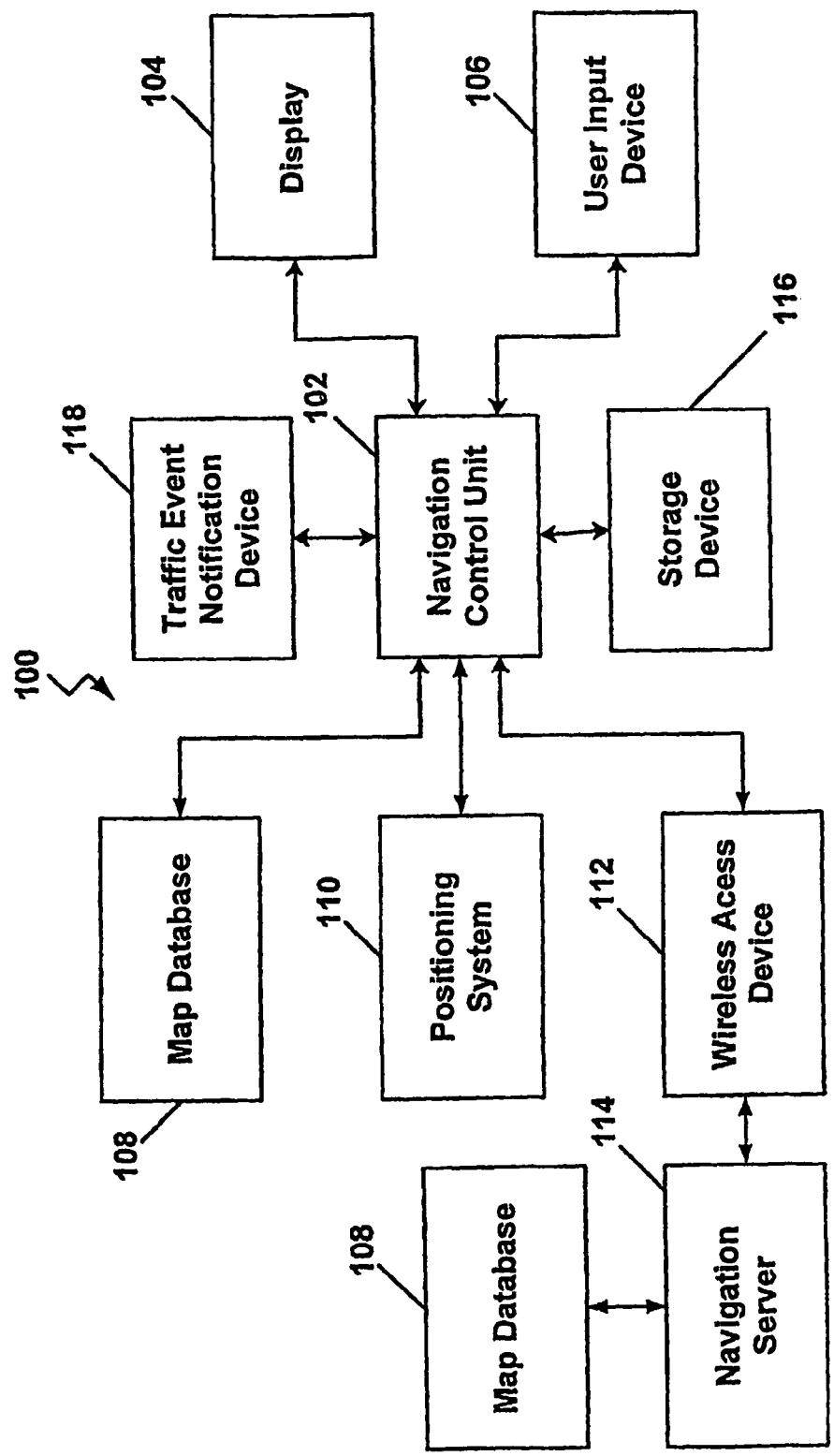
FIG. 1 is a block diagram of a vehicle navigation system.

In FIG. 1, a navigation system 100 with a route calculation module that is capable of determining marked diversions to avoid traffic obstacles or events is depicted. As illustrated, the navigation system 100 includes a navigation control unit 102 that includes software modules that are programmed to calculate routes from points of origin to destinations. Although not specifically illustrated, the navigation control unit 102 may include a Central Processing Unit ("CPU"), a system bus, a Random Access Memory ("RAM"), a Read Only Memory ("ROM"), an I/O adapter for connecting peripheral devices such as hard disc drives, CD-ROM drives, a communications adapter, and a display adapter. Various computing devices and components may be used to provide the functionality of the navigation control unit 102.

The navigation control unit 102 may be connected with a display 104. In one example, the display 104 may be a touch-screen display that functions as both a display and a user input device. In yet another example, the navigation control unit 102 may be connected with a user input device 106. The user input device 106 may be a keypad, a personal computer, a laptop computer, a pocket PC, a personal digital assistant, a wireless access device or phone, or any other type of device that is capable of allowing a user of the navigation system 100 to input data during operation.

If the user input device 106 communicates wirelessly with the navigation control unit 102, both the navigation control unit 102 and the user input device 106 may be connected with a wireless communication device that is capable of passing the necessary data back and forth between the user input device 106 and the navigation control unit 102. Some illustrative methods of connecting the user input device 106 with the navigation control unit 102 that may be used include infrared, Bluetooth, wireless LAN, Universal Serial Bus, fiber optic, direct wire, parallel ports, serial ports, and a network connection in series.

As further illustrated, the navigation control unit 102 may be connected to a digital map database 108. The digital map database 108 may be located on a hard disc storage device, a CD-Rom, or any other suitable storage medium. The digital map database 108 contains a digital map of a road network for various geographic locations as well as other types of data. The digital map database 108 allows the navigation control unit 102 to display a map of a geographic location including road networks and can help locate an address or destination using a street address or nearby intersections. In addition, the digital map database 108 can help calculate a travel route, can match sensor-detected vehicle trajectory with a known road network to determine more accurately the actual position of the vehicle; or provide travel information such as road classification data, travel guides, landmarks, hotel and restaurant information.

The navigation control unit 102 may also be connected to at least one positioning system 110. The positioning system 110 may be used to determine the geographic location or coordinates of a vehicle in which a portion of the navigation system 100 is installed. In addition, the positioning system 110 may determine the trajectory of the vehicle. Positioning involves the determination of the geo-coordinates of the vehicle on the surface of the Earth. Knowing the position and trajectory of the vehicle allows the navigation control unit 102 to determine the precise position of the vehicle relative to a road network map. The navigation control unit 102 is also able to provide maneuvering instructions to the driver of the vehicle by knowing the geographic location and trajectory of the vehicle.

Three exemplary types of positioning systems 110 that may be used include a stand-alone system, a satellite-based system, and a terrestrial radio based system. A dead reckoning system is an illustrative stand-alone system that may be used by the navigation system 100. A satellite-based system that may be used involves equipping the vehicle with a global positioning system ("GPS") receiver or any other type of system that uses satellites to determine geographic locations. A terrestrial radio based system is a system that uses measurement techniques to determine the location of the vehicle. Three commonly used measurement techniques for terrestrial positioning are time of arrival ("TOA"), angle of arrival ("AOA"), and time difference of arrival ("TDOA"). A combination of all of the example positioning systems discussed above, as well as others, may be used by the navigation system 100.

A wireless access device 112 may be connected with the navigation control unit 102. In one example, the wireless access device 112 is operable to connect the navigation control unit 102 with a navigation server 114. In this example, route calculation and data storage may be accomplished by the navigation server 114. This embodiment represents a server-based solution in which a majority of the processing occurs at the navigation server 114 as opposed to the navigation control unit 102 of the vehicle navigation system 100. The navigation control unit 102 may log into the navigation server 114 using the wireless access device 112. A wireless data transmission protocol (such as WAP) may be used to transmit data and route planning information generated by the navigation server 114 to the navigation control unit 102.

The navigation control unit 102 may also be connected with a memory storage device 116. The memory storage device 116 may be used to store various types of data that is used by the navigation system 100. Trip origins and trip destinations may be stored in the memory storage device 116. In addition, routes to trip destinations may be stored in the memory storage device 116. As set forth in detail below, marked diversions that are calculated by the navigation system 100 may also be stored in the memory storage device 116. Alternatively, the memory storage device 116 may be associated with the navigation server 114. Associated data may be stored in connection with the navigation server 114. Data may then be transferred to the navigation control unit 102 using the wireless access device 112.

The navigation system 100 may also include a traffic event notification device 118 that receives incoming notifications of traffic events. The traffic event notification device 118 may be connected with the navigation control unit 102. The navigation control unit 102 may use signals received from the traffic event notification device 118 to dynamically route a vehicle in which the navigation system 100 is installed around traffic obstacles or events that may be in front of the driver. Several different types of traffic event notification devices 118 may be used by the navigation system 100.

Figure 2:
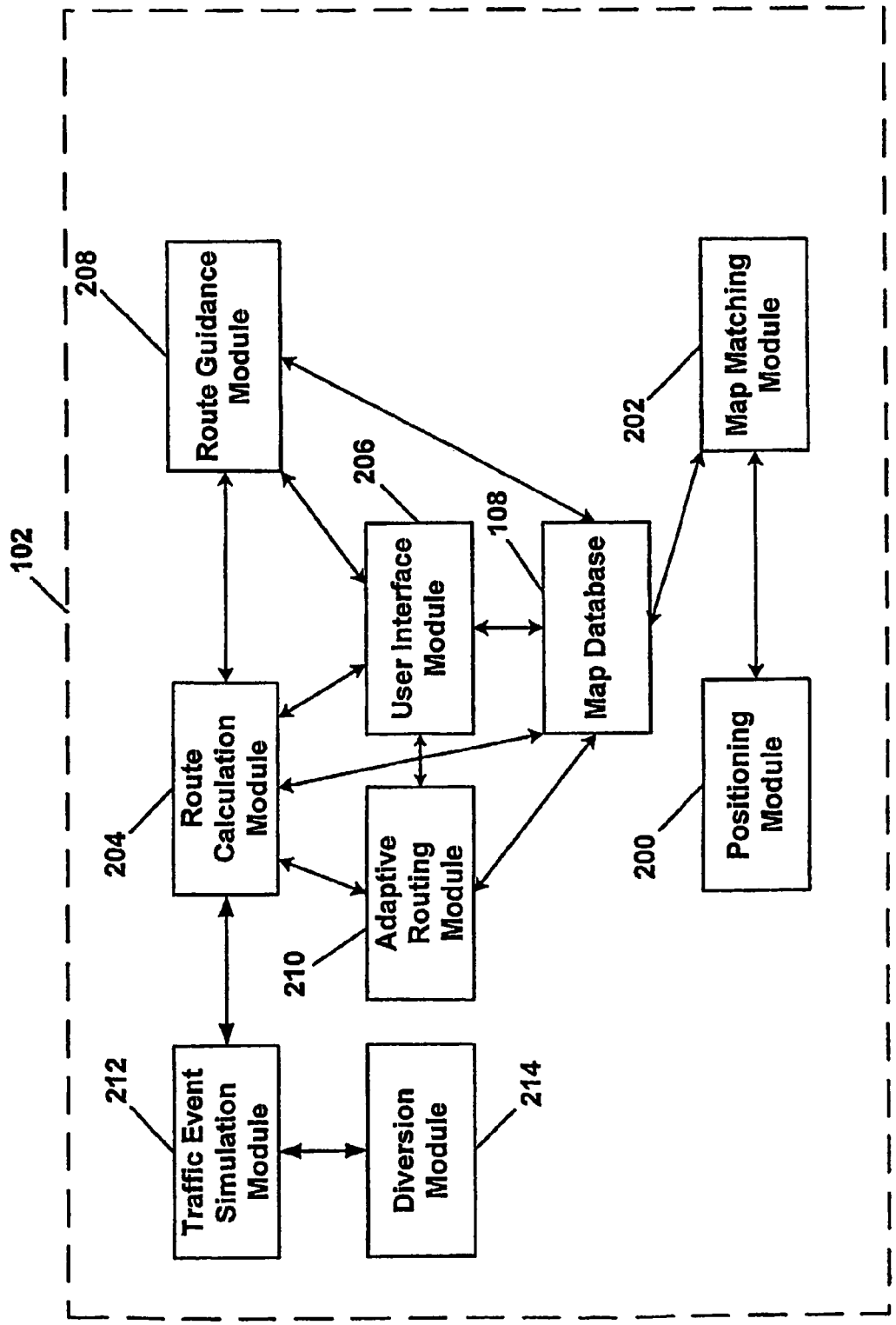
FIG. 2 is a block diagram of application modules located on a navigation control unit in the vehicle navigation system of FIG. 1.

In FIG. 2, the navigation control unit 102 may include a digital map database 108. The digital map database 108 contains map information in a predefined format that is capable of being read and used by the navigation control unit 102 or the navigation server 114. The navigation control unit 102 may use the map information for map related functions such as identifying and providing locations, address information, road classifications, road restrictions, road names, traffic regulations, travel information and so forth. The digital map database 108 may also contain a road network map of various geographic locations. The road network map may include nodes and segments that make up roads that are used by vehicles to travel to predetermined destinations. Nodes as used herein may be defined as road intersections or where exits exist from roads and segments are defined as sections of roads that exist between nodes.

A positioning module 200 may be included on the navigation control unit 102 that determines the geographic location and trajectory of the vehicle using the positioning device 110. As set forth above, several different positioning devices 110 may be used to determine the trajectory and geographic position of the vehicle. The positioning module 200 may include an integration algorithm that takes output signals generated by various positioning devices 110 to determine the precise geographic location and trajectory of the vehicle.

Once the geographic location and trajectory of the vehicle have been determined, a map matching module 202 may be used to match the geographic location of the vehicle with a position on the road network map generated with the digital map database 108. A map-matching algorithm of the map matching module 202 may be used to place the vehicle in the proper location on the road network map. The map matching module 202 is capable of correlating the vehicle position and trajectory from the positioning module 200 to the road network map by comparing the vehicle trajectory and location with the map data present in the digital map database 108.

The navigation control unit 102 may also include a route calculation module 204. Route calculation is the process of planning a route prior to or during a trip to a predetermined destination. The route calculation module 204 may use a shortest path algorithm to determine a recommended route from a trip origin to a trip destination. In the server-based solution, the navigation server 114 may also include the route calculation module 204. Different shortest path algorithms and variations of shortest path algorithms may be used in the navigation system 100 as well as other types of algorithms.

The shortest path algorithm may also include a route optimization module that uses planning criteria to plan the route. The quality of any given route may depend on many factors and selection criteria such as distance, road types, speed limits, location, number of stops, number of turns and traffic information. The route selection criteria can either be fixed at manufacture or may be implemented through a user interface module 206. Determination of the best route uses the selection criteria and a digital road network map retrieved from the digital map database 108 to minimize distance and travel time. The navigation system 100 may also allow drivers to compute routes interactively by opening or closing nodes or segments in the road network map.

In FIG. 2, the navigation control unit 102 may also include a user interface module 206. The user interface module 206 may generate a graphical user interface ("GUI") on the display 104. The user interface module 206 may also allow a user of the navigation system 100 to interact with the vehicle navigation system 100 and enter inputs into the navigation system 100. The user interface module 206 may receive inputs from the display 104 if it is a touch-screen display. The user input device 106 may also be used to enter inputs into the user interface module 206. The user inputs may be provided to the route calculation module 204, which may then calculate a route to a destination that is input by the driver.

The navigation control unit 102 may also includes a route guidance module 208. The route guidance module 208 may guide the driver along the route generated by the route calculation module 204. The route guidance module 208 may use the positioning module 200, the digital map database 108 and the map matching module 202 to guide the driver along the route to their respective destination. The route guidance module 208 may also allow the user interface module 206 to generate a road network map GUI on the display 104 that illustrates where the vehicle is located on the road network map and the direction the vehicle is traveling.

As illustrated, the navigation control unit 102 may also include an adaptive routing module 210. As set forth above, the route calculation module 204 is used to calculate the shortest route between a trip origin and a trip destination. The adaptive routing module 210 may allow the user or driver of the vehicle to adjust the route that has been calculated by the route calculation module 204 based on user preferences. The adaptive routing module 210 may allow the user to open or close nodes and segments in the road network map. Once the nodes or segments have been opened or closed, the adaptive routing module 210 may pass this information to the route calculation module 204, which then re-calculates a new route to the predetermined destination based on the user preferences. The adaptive routing module 210 may also determine the new route of the vehicle.

Figure 3:
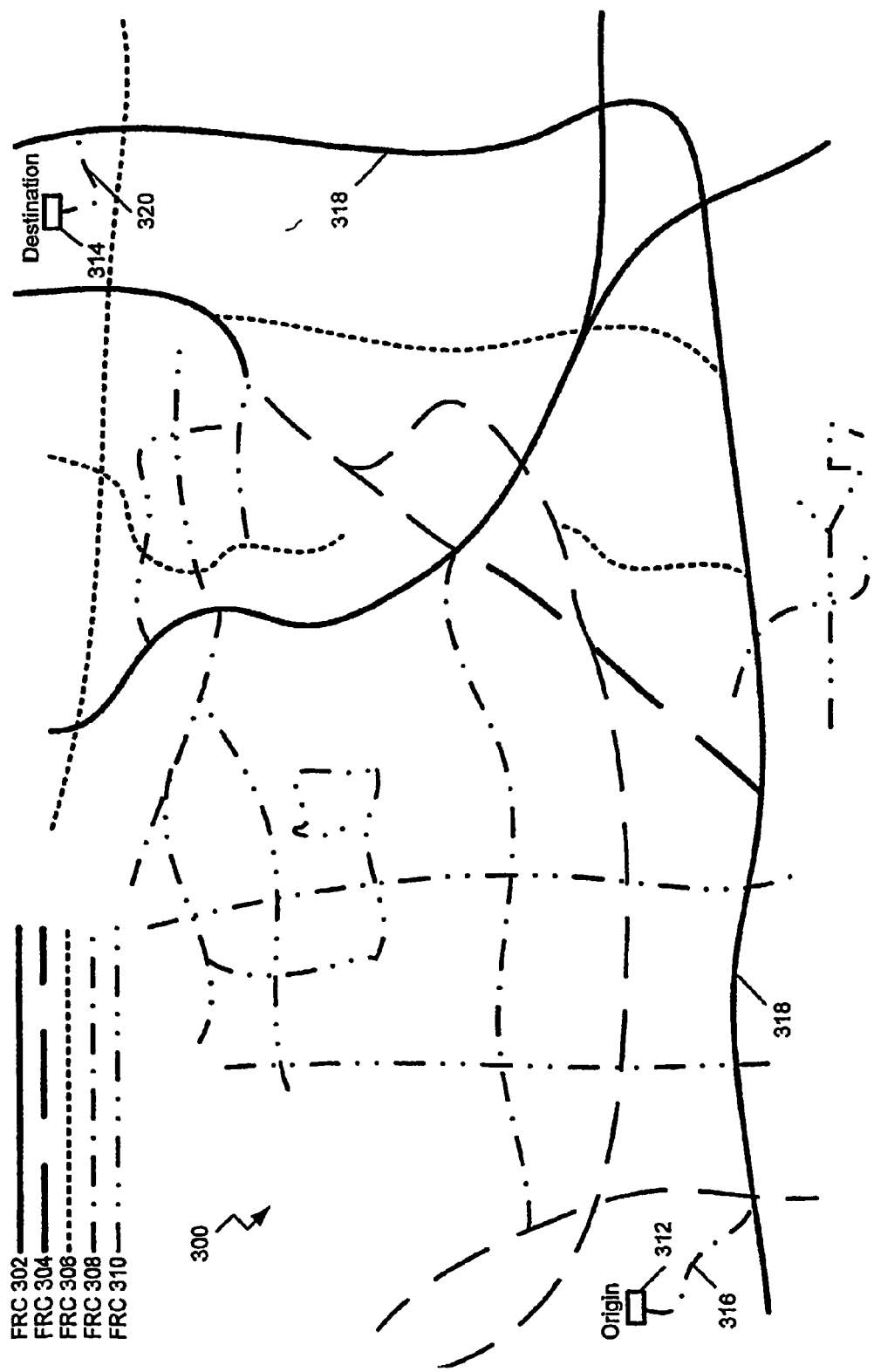
FIG. 3 is an illustrative road network map showing a plurality of road segments that are classified in several types of functional road classes.

The navigation system 100 illustrated in FIG. 2 may also include a traffic event simulation module 212. The traffic event simulation module 212 may simulate traffic events along routes that are calculated to destinations. The navigation system 100 may also include a diversion module 214 that is used to calculate marked diversions around traffic events that are simulated along the route by the traffic event simulation module 212. The diversion module 214 may then store the marked diversions in a memory location of the memory storage device 116. If a traffic event occurs along a route at a location, the diversion module 214 may then be used to retrieve a marked diversion to avoid the traffic event. In FIG. 3, an illustrative road network map 300 that maybe contained in the digital map database 108 for a given geographic area. As depicted, the road network map 300 may include a plurality of functional road classes 302-310 that make up the road network map 300. For illustrative purposes only, functional road class 302 may comprise interstates. Functional road class 304 may consist of highways or arterial expressways and functional road class 306 may consist of city streets. In addition, functional road class 308 may consist of rural roads and functional road class 310 may consist of neighborhood streets. It is important to note that road network map 300 is for illustrative purposes only and that other types of functional road classes may exist in other road network maps. As such, the road network map 300 depicted in FIG. 3 as well as the functional road classes depicted therein should not be viewed as a limitation of the invention set forth in this description and should be viewed only in an illustrative sense.

The navigation system 100 may be used by a driver to plan a route that may include a trip origin 312 and a trip destination 314. The route calculation module 204 of the navigation system 100 may be used to plan the route to the trip destination 314. The route calculation module 204 may calculate the route to take the shortest amount of time or distance traveled along the route. For illustrative purposes only, in FIG. 3 the route that may have been calculated by the route calculation module 204 may consist of rural road 316, interstate 318 and rural road 320. The reason for this route being calculated in this example is that the driver of the vehicle will spend a majority of time and travel distance on interstate 318, which will allow the driver to travel faster than using other roads set forth in FIG. 3, thereby providing the driver with the shortest travel time to reach the trip destination 314.

Figure 4:
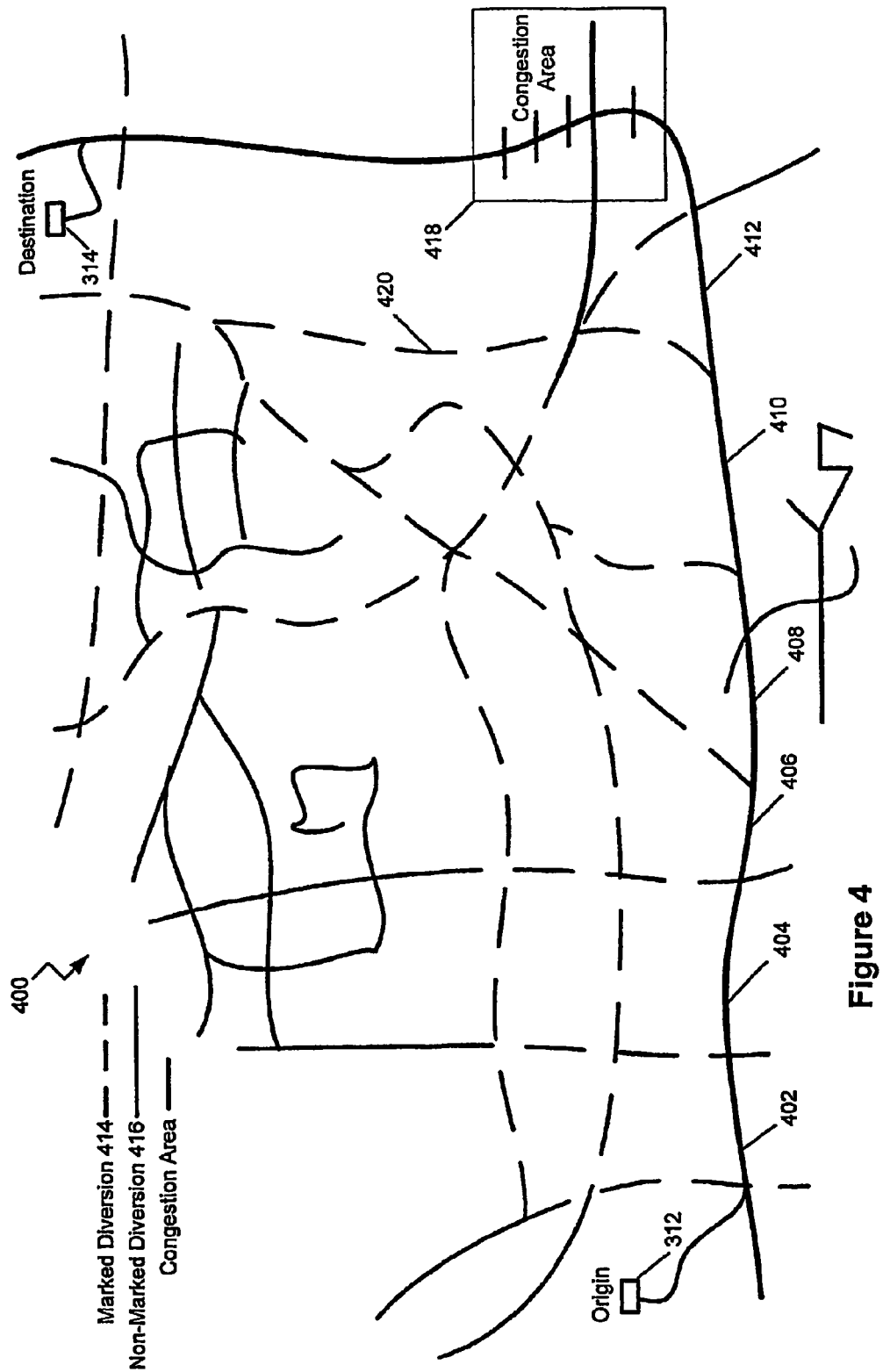
FIG. 4 is an illustrative road network map depicting marked diversions to traffic events calculated by the diversion module.

In FIG. 4, another illustrative road network map 400 is set forth that resembles the road network map 300 set forth in FIG. 3, however, the functional road classes 302-310 have been removed to gain a better understanding of the invention. As set forth above, the navigation system 100 includes a traffic event simulation module 212 that is operable to simulate traffic events on a predetermined number of road segments along the route to the trip destination 314. The traffic events may be simulated on every road segment on major roads along the route and road segments may be located where two roads intersect or along exits off the major road. As an example, the traffic event simulation module 212 may simulate traffic events at road segments 402-412.

In FIG. 4, the diversion module 214 creates a plurality of marked diversions 414 that avoid traffic events that may occur in road segments along the normal route that was calculated by the route calculation module 204. Roads that do not contain marked diversions are designated as non-marked diversions 416 in FIG. 4. As such, the diversion module 214 may calculate alternative routes that will avoid any traffic events that may occur along the route to the trip destination 314. The diversion module 214 may use any functional road class to create the marked diversions 414, whereas the traditional route calculation module 204 would likely not use smaller roads to plan a route. The marked diversions 414 may be calculated to begin at a predetermined distance before the traffic event and end at a second predetermined distance behind the traffic event.

After the diversion module 214 calculates the marked diversions 414 they may be stored in a memory location of the memory storage device 116. As such, if a traffic event occurs while the driver is traveling to the trip destination 314 along the normal route, the route calculation module 204 may avoid searching every road near the traffic event and will only look for an alternative route using roads that have already been designated as marked diversions 414. The navigation system 100 thereby saves time avoiding traffic events by concentrating on marked roads while ignoring roads that do not contain the attribute of a marked diversion 414.

In FIG. 4, a congestion area 418 is set forth as an example of a traffic event that may occur along the route to the trip destination 314. Instead of searching every road on the road network map 400, the route calculation module 204 will only search for an alternative route that avoids the traffic event on roads that have previously been designated with a marked diversion 414. In this example, the route calculation module 204 may designate city street 420 for the driver of the vehicle to use to avoid the traffic event. However, other alternative functional road classes such as roads, streets, interstates and expressways may be used as an alternative route to avoid the traffic event. The route calculation module 204 may use an alternative route that provides the fastest travel time and/or the minimal travel distance. The route calculation module 204 may also calculate the alternative route to end a predetermined distance after the traffic event and return the driver to the original route.

Figure 5:
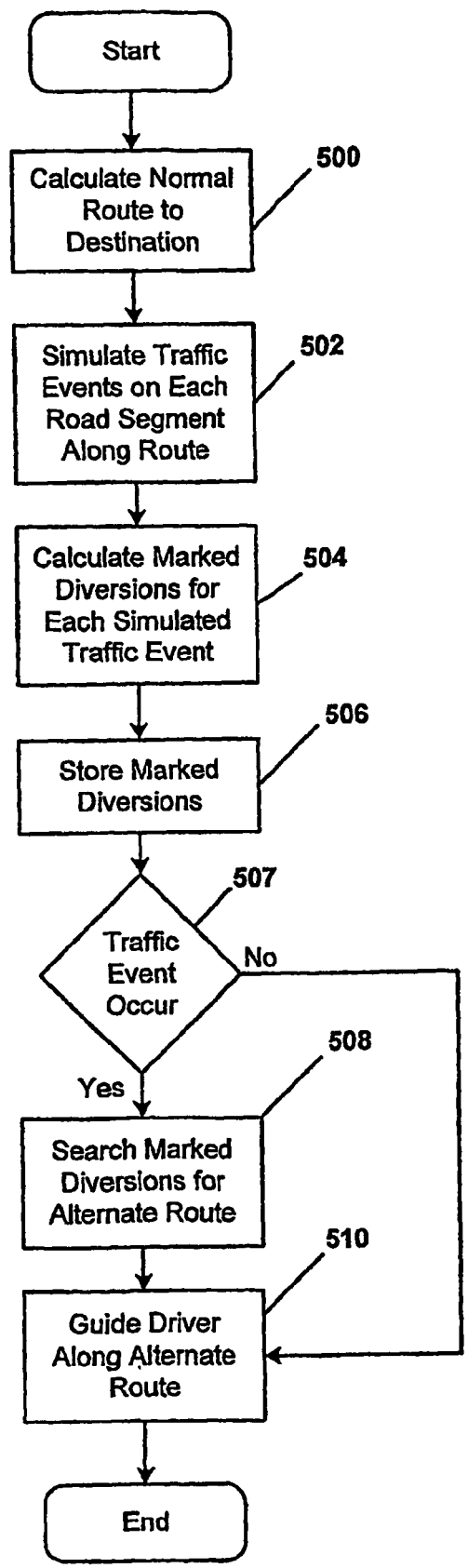
FIG. 5 is a flow chart illustrating exemplary process steps performed by the navigation system when calculating and using marked diversions.

In FIG. 5, illustrative process steps performed by the navigation control unit 102 are illustrated. At step 500, the route calculation module 204 may calculate a route to a trip destination based on user inputs received from the display 104 or the user input device 106. The route calculation module 204 uses the digital map database 108 and the map matching module 202 to determine the route to the destination. In addition, road attributes may also be taken into consideration when calculating the route and typically the route calculation module 204 may choose roads that will get the driver to the destination in the shortest amount of time possible. This will typically involve the use of major roadways or interstates if available along the route and smaller roadways will be ignored or not used. In addition, the driver may also be provided with route options that allow the driver to avoid using routes that may have tolls, tunnels or special motorways.

After the route to the destination has been calculated, at step 502 the traffic event simulation module 212 may be called upon to simulate a plurality of traffic events that might occur along the route. The traffic event simulation module 212 may simulate traffic events by dividing the route into a plurality of road segments and simulating traffic events along each of these road segments or a select number of road segments. Road segments may be comprised of places along the route where two roadways intersect or where there is an exit from a roadway onto another roadway. In addition, the traffic event simulation module 212 may simulate combinations of traffic events by blocking multiple road segments along the route.

At step 504, the diversion module 214 may be used to calculate at least one marked diversion for each traffic event that is simulated along the route. The marked diversions consist of alternative roads that may be used by the driver to avoid the traffic events that may occur along the route. A plurality of marked diversions may be calculated for each traffic event that occurs at each road segment along the route. In addition, the diversion module 214 may ignore functional road classes when calculating the marked diversions thereby allowing the driver to use smaller roads that otherwise would not be considered for use by the route calculation module 204. At step 506, the diversion module 214 may store all of the marked diversions that have been calculated in a predetermined memory location of the storage device 116. At step 507, the vehicle navigation system 100 monitors to determine if a traffic event occurs, if a traffic event occurs the vehicle navigation system 100 proceeds to step 508 and if it does not occur the vehicle navigation system guides the driver along the route.

Once the driver begins the trip to the destination, the traffic event notification device 118 may provide the navigation control unit 102 with a notification of a traffic event along the route. If this occurs, at step 508 the navigation control unit 102 will use the route calculation module 204 to determine a route that avoids the traffic event. To determine the route that will avoid the traffic event, the route calculation module 204 will only search the marked diversions that have been stored in the memory location of the storage device 116. The notification may contain information that designates a road segment that is affected by the traffic event and therefore, the route calculation module 204 may only need to search the marked diversions that are associated with that particular road segment. As such, time and processing power is saved because the navigation system 100 does not have to search all roads along the route to determine a route that avoids the traffic event.

At step 510, the route guidance module 208 may be used to guide the driver of the vehicle along the alternate route that has been determined by the route calculation module 204 that avoids the traffic event based on the marked diversions. The marked diversion may lead the driver to the trip destination or it may place the driver back on the original route at a predetermined distance beyond the traffic event. The diversion module 214 may calculate the marked diversions to begin at a location in front of the traffic event and end at a location beyond the traffic event on or off of the original route to the destination.

The navigation server 114 may alternatively calculate and store the marked diversions in other examples of the invention. The wireless access device 112 may be used by the navigation server 114 to transmit data to the vehicle navigation system 100. As set forth above, this represents a server-based solution for the vehicle navigation system 100. Each of the software modules described above may be located on the navigation server 114 and may perform each of the tasks set forth above. The positioning device 110 of the vehicle navigation system 100 may transmit geographic coordinates of the vehicle to the navigation server 114 as well as data indicating the trip destination. The navigation server 114 may also include a traffic event notification device that informs the navigation server 114 of traffic events along the route. The navigation server 114 may then use the marked diversions to guide the driver around traffic events and on to the ultimate trip destination.

In another example of the invention, the digital map database 108 may contain a digital map of a road network for various geographic locations as well as other types of data. In particular, the digital map database 108 may contain information about the functional road classes of various roadways or roads that are contained within the road network map. The functional road classes may designate roads in many different categories such as, for example, interstates, motorways, tollways, city streets, urban arteries, rural streets, neighborhood streets and so forth.

The digital map database 108 may be generated based on geographic coordinates and a plurality of roadways that are positioned with respect to the geographic coordinates. The process of converting a map into a digital map database may be referred to as a map conversion. A map of any given area will contain a plurality of roadways that may be used by a driver to travel to a destination. The roadways may be classified in one of the functional road classes set forth above or any other type of functional road class. Other data such as speed limits and a lane count may also be stored in the digital map database.

During map conversion a plurality of obstacles or traffic events may be simulated between respective nodes or segments of the roadways that are included in the road network map contained in the digital map database 108. Although not specifically illustrated, a traffic event simulation module may be used to simulate the traffic events that may occur on a segment of the roadway. In addition, the traffic event simulation module may be used to simulate traffic events along multiple segments of the roadway.

Once the traffic events are simulated, at least one marked diversion may be generated for each segment of roadway that is contained in the road network map or for multiple segments of the roadway. As such, a plurality of marked diversions may be generated that are associated with a respective segment of the roadway or multiple segments of the roadway. The marked diversions may be stored in the digital map database 108 in addition with the other data that is stored in the digital map database 108.

A route guidance module 208 located on the vehicle navigation system 100 may be used to guide the driver of the vehicle along the route that has been calculated by the route calculation module 204. If the vehicle navigation system 100 receives information indicating that a traffic event has occurred along one or more of the road segments of the route, the route calculation module 204 may lookup the marked diversion that is associated with that particular road segment and guide the driver along an alternative route that avoids the traffic event.

In this example, the marked diversions are calculated and stored in the digital map database 108. The marked diversions are determined ahead of time by a traffic event simulation module 212 so that the vehicle navigation system 100 does not have to calculate diversions around traffic events as they occur while the user is traveling to the destination. If the traffic event notification device 118 notifies the navigation control unit 102 of a traffic event along a road segment that is included in the route, the diversion module 214 may locate an alternate route that avoids the traffic event by looking up a marked diversion that is already contained in the digital map database 108.

The vehicle navigation system 100 may include a route calculation module 204 that is operable to calculate a route to a trip destination that is input by a user. A traffic event notification device 118 may be connected with the navigation control unit 102 that may generate a traffic event notification message that contains an indication of a traffic event that may have occurred on a respective road segment. A diversion module 214 may be included for retrieving an alternative route that avoids the traffic event from a list of marked diversions contained in the digital map database that is associated with the respective road segment where the traffic event has occurred. The diversion module 214 may be a software component of the route planning module 204 or a separate software module.

In yet another example, a method of creating a digital map database 108 for use in a vehicle navigation system 100 is disclosed that includes marked diversions that may be used to avoid traffic events. A road network map is created that includes a plurality of road segments. The road network map may be stored in a digital map file. A traffic event may be simulated along each respective road segment of the road network map using a traffic event simulation module 212. At least one marked diversion may then be calculated that avoids the traffic event for each road segment. The marked diversions that are calculated may then be stored in the digital map database 108 for use by the vehicle navigation system 100 if a traffic event is experienced along a route that is being traveled by a vehicle.

As described above, the invention allows the vehicle navigation system 100 to use marked diversions that are calculated to avoid traffic events that may occur along road segments. In some examples of the invention, the marked diversions are calculated during the map conversion process when the digital map database 108 is being created for use by the vehicle navigation system 100. This allows the vehicle navigation system 100 to conserve processing power during operation because the alternative routes that avoid the traffic events have already been calculated and stored during the map conversion process. In addition, this allows the use of small functional road classes when calculating alternative routes that avoid traffic events, which would typically not be used on long haul trips.

While various embodiments of the invention have been described, it will be apparent to those of ordinary skill in the art that many more embodiments and implementations are possible that are within the scope of the invention. Accordingly, the invention is not to be restricted except in light of the attached claims and their equivalents.

What is claimed is:

1. A navigation system for a vehicle comprising:
a digital map database containing a road network map that is divided into a plurality of road segments;
a route planning module to calculate a route to a trip destination using the road network map;
a traffic event simulation module to simulate at least one traffic event in at least one road segment;
a traffic event notification device operable to receive a traffic event notification message indicating a traffic event has occurred along a respective road segment of the route; and
a diversion module to retrieve an alternative route that avoids the traffic event by locating at least one marked diversion contained in the digital map database that is associated with the respective road segment where the traffic event has occurred.

2. The navigation system of claim 1 further comprising a route guidance module for guiding the vehicle along the route and the alternative route.

3. The navigation system of claim 1 where the respective road segment is located between at least two intersections with other road segments.

4. The navigation system of claim 1 where the at least one marked diversion is calculated to begin at a first predetermined distance before the traffic event and end a second predetermined distance after the traffic event.

5. The navigation system of claim 1 where the at least one marked diversion is calculated to use a small functional road class to avoid the traffic event.

6. The navigation system of claim 5 where the small functional road class is located by searching a road class attribute found in the digital map database.

7. A method of creating a digital map database for use in a navigation system comprising:
converting a road network map that includes a plurality of road segments into a digital map file;
simulating a traffic event along at least one road segment of the road network map;
calculating at least one marked diversion that avoids the traffic event for each road segment; and
storing the marked diversion in the digital map file.

8. The method of claim 7 where converting the road network map comprises identifying the road segments as between at least two intersections with other road segments.

9. The method of claim 7 where calculating the at least one marked diversion comprises calculating the at least one marked diversion to begin a first predetermined distance in front of the traffic event and end a second predetermined distance behind the traffic event.

10. The method of claim 7 where the marked diversion is calculated to use a small functional road class to avoid the traffic event.

11. The method of claim 10 where the small functional road class is located by searching a road class attribute associated with each of the road segments in the road network map.

12. In a vehicle navigation system, including a computer, for determining and outputting an alternate route to a destination, a computer program product for creating a digital map database for use with the vehicle navigation system comprising:
   a computer usable medium having computer readable program code embodied in said medium for avoiding traffic events, said computer program product having:
   computer readable program code to generate a road network map including a plurality of road segments;
   computer readable program code to simulate a traffic event in at least one of the road segments contained in the road network map;
   computer readable program code to calculate at least one marked diversion that avoids the traffic event; and
   computer readable program code to store the at least one marked diversion in a digital map database.

13. The computer program product of claim 12 where each of the road segments are located between at least two intersections of the road segments.

14. The computer program product of claim 12 where the at least one marked diversion is calculated based on a shortest travel time factor.

15. The computer program product of claim 12 where the at least one marked diversion is calculated using a small functional road class to avoid the traffic event.

16. The computer program product of claim 12 where the at least one marked diversion is calculated to begin a first predetermined distance before the traffic event and end a second predetermined distance after the traffic event.

17. The computer program product of claim 12 where the traffic event is simulated on consecutive road segments.

18. A map conversion system for creating a digital map database comprising:
   means for generating a road network map including a plurality of road segments;
   means for simulating a traffic event in at least one road segment contained in the road network map;
   means for calculating at least one marked diversion that avoids the traffic event and
   means for storing the at least one marked diversion in a digital map database.

19. The map conversion system of claim 18 where the at least one road segment is located between two intersections of other road segments.

20. The map system of claim 18 where the at least one marked diversion is calculated to avoid the traffic event using a shortest distance factor.

21. The map conversion system of claim 18 where the at least one marked diversion is calculated to begin a first predetermined distance before the traffic event and end a second predetermined distance after the traffic event.

22. The map conversion system of claim 18 where the at least one marked diversion is calculated to use a small functional road class to avoid the traffic event.

23. The map conversion system of claim 22 where the small functional road class is determined as a function of a road class attribute.

24. A navigation system comprising:
   a route planning module configured to calculate a route to a trip destination using a road network map that includes a plurality of road segments;
   a simulation module configured to simulate a traffic event in at least one of each of a plurality of road segments along the route;
   a diversion module configured to calculate at least one marked diversion that avoids the traffic event in each of the road segments; and
   a memory device to store the at least one marked diversion for use if a respective traffic event occurs along the route at one of the respective road segments.

25. The navigation system of claim 24 where each of the road segments are located between at least two intersections with other road segments.

26. The navigation system of claim 24 where the at least one marked diversion is calculated to begin a first predetermined distance before the traffic event and end a second predetermined distance after the traffic event.

27. The navigation system of claim 24 where the marked diversion is calculated to use a small functional road class to avoid the traffic event.

28. The navigation system of claim 27 where the small functional road class is located by searching a road class attribute found in a digital map database.

29. The navigation system of claim 24 where the at least one marked diversion is calculated to end a predetermined distance after the traffic event.

30. The navigation system of claim 24 where the at least one marked diversion is calculated to avoid consecutive traffic events along consecutive road segments along the route.

31. The navigation system of claim 24 further comprising a traffic message receiving device for receiving a notification of the traffic event.

32. A method of avoiding traffic events with a navigation system comprising:
   creating a route to a predetermined destination on a road network map;
   dividing the route on the road network map into a plurality of road segments;
   simulating a traffic event on each road segment along the route;
   calculating at least one marked diversion around each respective simulated traffic event;
   storing the at least one marked diversion in a memory location; and
   creating an alternative route with the at least one marked diversion when an actual traffic event occurs on a respective road segment.

33. The method of claim 32 where functional road classes are ignored when calculating the at least one marked diversion.

34. The method of claim 32 where dividing the route comprises locating each of the road segments between at least two road intersections in the road network map.

35. The method of claim 32 where the traffic events are simulated on consecutive road segments.

36. The method of claim 32 where the at least one marked diversion used to create the alternative route is selected based on a shortest time factor.

37. The method of claim 32 where the at least one marked diversion used to create the alternative route is selected based on a shortest distance factor.

38. The method of claim 32 further comprising receiving a traffic event notification from a traffic event notification device.

39. The method of claim 32 where the at least one marked diversion is calculated to begin a first predetermined distance before the traffic event and end a second predetermined distance after the traffic event.

40. The method of claim 32 where the at least one marked diversion is calculated to use a small functional road class to avoid the traffic event.

41. The method of claim 40 where the small functional road class is determined by searching a road class attribute found in a digital map database.

42. In a vehicle navigation system, including a computer, for determining a marked diversion to avoid a traffic delay, a computer program product for use with the vehicle navigation system comprising:
   a computer usable medium having computer readable program code embodied in said medium for avoiding traffic events, said computer program product having:
   computer readable program code to calculate a route to a destination using a digital road network map that includes a plurality of road segments;
   computer readable program code to simulate a plurality of traffic events in the road segments along the route;
   computer readable program code to calculate a plurality of marked diversions around the traffic events using alternative routes determined from the digital road network map; and
   computer readable program code to store the marked diversions in a memory location.

43. The computer program product of claim 42 further comprising computer readable program code to use at least one of the marked diversions if a traffic event is experienced along a respective road segment of the route.

44. The computer program product of claim 43 where at least one of the marked diversions used is selected based on a shortest travel time factor.

45. The computer program product of claim 42 further comprising computer readable program code to determine a shortest marked diversion along the route, where the shortest marked diversion is used if a traffic event is experienced in a road segment along the route.

46. The computer program product of claim 42 where at least one of the marked diversions is calculated using a small functional road class to avoid the traffic event.

47. The computer program product of claim 42 where at least one of the marked diversions is calculated to begin a first predetermined distance before the traffic event and end a second predetermined distance after the traffic event.

48. The computer program product of claim 42 where the traffic event is simulated on consecutive road segments.

49. The computer program product of claim 42 further comprising computer readable program code to receive a traffic event notification from a traffic event notification device that sets forth the traffic event.

50. A navigation system, comprising:
   means for determining a route to a destination using a road network map having a plurality of road segments;
   means for simulating at least one traffic event on at least one respective road segment along the route;
   means for calculating at least one marked diversion that avoids the at least one traffic event along the route; and
   means for storing the marked diversion in a memory location.

51. The navigation system of claim 50 further comprising means for retrieving a respective marked diversion if a respective traffic event is experienced along the route.

52. The navigation system of claim 51 further comprising means for guiding a user along the respective marked diversion if a respective traffic event is experienced along the route.

53. The navigation system of claim 50 where the at least one marked diversion is calculated to avoid the at least one traffic event using a shortest distance factor.

54. The navigation system of claim 50 where each of the road segments are located between at least two intersections of the road segments.

55. The navigation system of claim 50 where the at least one marked diversion is calculated to begin a first predetermined distance before the traffic event and end a second predetermined distance after the traffic event.

56. The navigation system of claim 50 where the at least one marked diversion is calculated to use a small functional road class to avoid the traffic event.

57. The navigation system of claim 56 where the small functional road class is determined as a function of a road class attribute found in a digital map database.

58. The navigation system of claim 50 where the at least one marked diversion is calculated to end at a predetermined distance beyond the traffic event along the route.

59. The navigation system of claim 50 where the at least one traffic event is a plurality of traffic events and the at least one marked diversion is calculated to avoid consecutive traffic events along more than one of the road segments along the route.

60. The navigation system of claim 50 further comprising a traffic event notification device for receiving a notification of the at least one traffic event.

61. A method of avoiding traffic events with a navigation system comprising the steps of:
   creating a route to a predetermined destination on a road network map that includes a plurality of road segments;
   simulating a traffic event on each road segment along the route;
   calculating at least one marked diversion around each respective traffic event for each road segment;
   storing each marked diversion in a memory location that is associated with the road segment;
   receiving a notification of a respective traffic event in a predetermined road segment along the route from a traffic event notification device; and
   retrieving a respective marked diversion from the memory location for use in avoiding the traffic event set forth in the notification.

\* \* \* \* \*